(12) United States Patent
Slee

(10) Patent No.: US 8,137,044 B2
(45) Date of Patent: Mar. 20, 2012

(54) WHEEL HANDLING APPARATUS

(75) Inventor: David Slee, Albany (AU)

(73) Assignee: Prowse Holdings Pty Ltd., Albany (AU)

(*) Notice: Subject to any disclaimer, the term of this patent is extended or adjusted under 35 U.S.C. 154(b) by 366 days.

(21) Appl. No.: 12/578,099

(22) Filed: Oct. 13, 2009

(65) Prior Publication Data
US 2010/0092269 A1    Apr. 15, 2010

(30) Foreign Application Priority Data
Oct. 10, 2008   (AU) ............................... 2008905264

(51) Int. Cl.
B65G 7/00    (2006.01)
(52) U.S. Cl. ........................ 414/429; 280/79.4
(58) Field of Classification Search .............. 414/426, 414/427, 429; 254/2 R, 4 R, 4 C, 2 C; 280/79.4
See application file for complete search history.

(56) References Cited

U.S. PATENT DOCUMENTS

| | | | | |
|---|---|---|---|---|
| 2,217,898 A | * | 10/1940 | Gemmill | 414/427 |
| 2,380,415 A | * | 7/1945 | Carruthers | 414/429 |
| 2,903,049 A | | 9/1959 | Carlson | |
| 3,828,953 A | * | 8/1974 | Reznicek | 414/428 |
| 3,830,387 A | * | 8/1974 | Virnig | 414/427 |
| 4,042,139 A | | 8/1977 | Pernsteiner et al. | |
| 4,051,966 A | * | 10/1977 | Cotton | 414/428 |
| 4,293,020 A | | 10/1981 | Leeper et al. | |
| 4,696,484 A | * | 9/1987 | Casey | 280/43.16 |
| 5,893,571 A | * | 4/1999 | Nowell | 280/43 |
| 6,095,745 A | | 8/2000 | Garnett | |
| 6,106,214 A | * | 8/2000 | Saffelle et al. | 414/427 |
| 7,097,406 B1 | * | 8/2006 | Gang | 414/429 |
| 7,232,138 B2 | * | 6/2007 | Shubert | 280/79.4 |
| 2001/0038094 A1 | * | 11/2001 | Lundy et al. | 254/1 |
| 2005/0074316 A1 | * | 4/2005 | Hedley et al. | 414/426 |
| 2008/0101898 A1 | * | 5/2008 | Hernandez | 414/426 |
| 2009/0155032 A1 | * | 6/2009 | Hedley et al. | 414/426 |
| 2010/0166531 A1 | * | 7/2010 | Bauer et al. | 414/429 |

FOREIGN PATENT DOCUMENTS

| | | |
|---|---|---|
| GB | 1315949 | 5/1973 |
| NL | 89022989 | 7/1991 |
| WO | WO-91/06437 | 5/1991 |

* cited by examiner

Primary Examiner — Joshua Rudawitz
(74) Attorney, Agent, or Firm — Charter IP LLC; Matthew J. Lattig

(57) ABSTRACT

A wheel handling apparatus includes a wheel engaging arrangement for holding a wheel assembly that is to be removed from a vehicle. The wheel engaging arrangement includes a first and a second wheel support arm, each of which is curved to follow the circumference of the wheel assembly to define a cradle in which the wheel assembly can rest as it is removed from the vehicle. The wheel handling apparatus further includes a wheel pivoting arrangement whereby the wheel engaging arrangement can be moved between a first orientation and a second orientation thus causing the wheel assembly held by the wheel engaging arrangement to be moved between a first and second orientation.

7 Claims, 6 Drawing Sheets

WHEEL HANDLING APPARATUS

BACKGROUND

1. Field

Example embodiments of the present invention in general relate to a wheel handling apparatus. In one example a wheel handling apparatus is described which can be used in removing a wheel assembly from a truck, for example, when the truck is to undergo routine maintenance.

2. Related Art

As persons familiar with servicing heavy vehicles will readily attest, there are certain service operations which require the combined efforts of two people. One such operation is the handling of truck and trailer wheel assemblies which typically have a weight of the order of 150 kg to 270 kg. Under normal workshop conditions, two people or a forklift are required to manoeuvre such a wheel when its bearings and/or brake drums require replacement. Also, once a relevant wheel assembly has been removed from an axle of a truck the wheel assembly is to be tilted and it will then need to be supported in some manner or another. In some extreme instances this support function is known to have been achieved with the use of crates. The reason for supporting the wheel assemblies, of course, is that if a heavy wheel assembly was simply allowed to rest on its side on a floor surface, it will be extremely difficult for a person to pick it up in order to be replaced after having undergone maintenance.

Australian Work Safe Regulations further limit the weight that can be lifted by a person during a service operation. In Western Australia, for example, the maximum weight which a single person is permitted to handle is 16 kg. It will be readily apparent to persons skilled in the art that lifting a truck wheel assembly will far exceed this permitted weight.

SUMMARY

An example embodiment of the present invention is directed to a wheel handling apparatus. The apparatus includes a wheel engaging arrangement for holding a wheel assembly that is to be removed from a vehicle. The wheel engaging arrangement includes a first and a second wheel support arm, where each wheel support arm is curved to follow the circumference of the wheel assembly, thereby defining a cradle in which the wheel assembly can rest as it is removed from the vehicle. The apparatus includes a wheel pivoting arrangement whereby the wheel engaging arrangement can be moved between a first orientation and a second orientation, thus causing the wheel assembly held by the wheel engaging arrangement also to be moved between a first and second orientation.

The wheel handling apparatus also may include an adjustor formation which can cooperate with the wheel engaging arrangement in order to adjust the dimensions of the cradle defined by the wheel engaging arrangement. The adjustor formation comprises a telescopic adjustable base arm which can cause the first and second wheel support arms to be moved either towards or away from one another, thereby adjusting the dimensions of the cradle.

The wheel handling apparatus includes an actuator for causing the wheel engaging arrangement to move from a rest position to a wheel engaging position. The actuator can be provided in the form of an hydraulic jack which is movable between a retracted position, in which it will cause the wheel engaging arrangement to be located in its rest position, and an extended position in which it will cause the wheel engaging arrangement to be located in its wheel engaging position.

In one example embodiment of the invention, the hydraulic jack is connected to a first and a second chain connector which in turn are connected to a linkage arrangement. The linkage arrangement of this embodiment comprises a first and a second crank respectively which are respectively connected to first and second connectors which, in turn, are respectively connected to first and second support columns.

The wheel pivoting arrangement can include a setting arrangement whereby the wheel support arms can be secured in their respective first and second orientations.

In an example, the wheel handling apparatus includes a support for carrying the wheel engaging arrangement. The support comprises two support members which are spaced apart by the adjustable base arm. In an example, each wheel support arm includes a connection arrangement which can be engaged by a handle member.

Another example embodiment is directed to a wheel handling apparatus. The apparatus includes a wheel engaging arrangement for holding a wheel assembly that is to be removed from a vehicle. The wheel engaging arrangement includes a first and a second wheel support arm which defines a cradle on which the wheel assembly can rest as it is removed from the vehicle. The apparatus includes a wheel pivoting arrangement whereby the wheel engaging arrangement can be moved between a first orientation and a second orientation, thus causing the wheel assembly held by the wheel engaging arrangement also to be moved between a first and second orientation.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
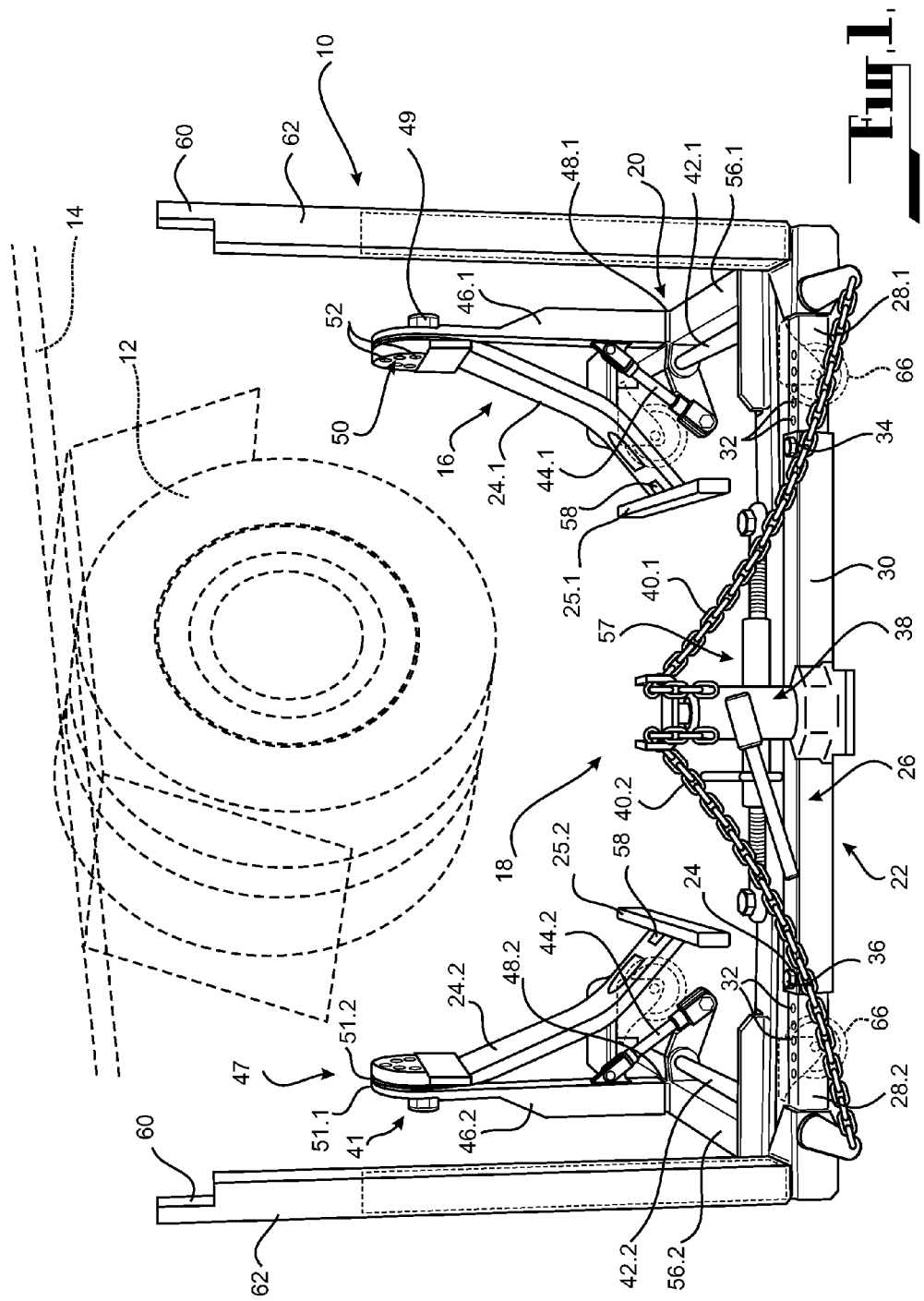
FIG. 1 is a front perspective view of a wheel handling apparatus in accordance with an example embodiment of the present invention and which is to be used to engage a wheel assembly of a truck.

FIG. 1 shows a wheel handling apparatus in accordance with the example embodiments, generally indicated with the reference numeral 10. The wheel handling apparatus 10 is shown to be located proximate a wheel assembly 12 of a truck 14 which is to undergo routine maintenance. The wheel handling apparatus 10 comprises a wheel engaging arrangement, generally indicated with the reference numeral 16, which defines a cradle 18 for holding the wheel assembly 12 in an upright orientation. The wheel handling apparatus 10 further includes a support 20 which carries the wheel engaging arrangement 16 as shown. The wheel handling apparatus 10 also includes an adjustor formation 22 which can cooperate with the wheel engaging arrangement 16 in order to adjust the dimensions of the cradle 18 defined by the wheel engaging arrangement 16. In use this feature will serve to ensure that that the wheel assembly 12 is securely held by the wheel engaging arrangement 16 in a manner as described below.

Figure 2:
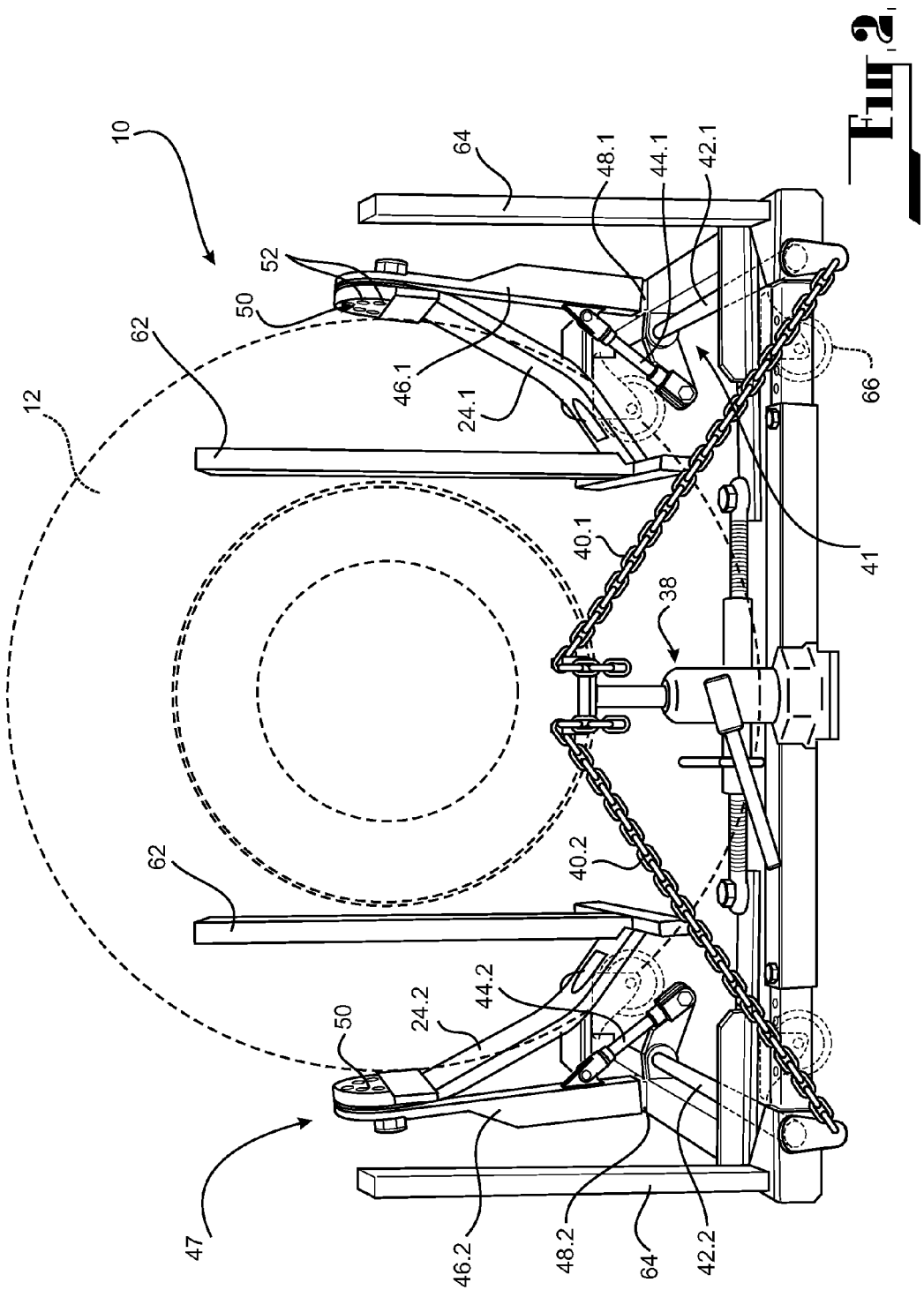
FIG. 2 is a front perspective view of the wheel handling apparatus wherein the wheel assembly is held by a wheel engaging arrangement of the wheel handling apparatus.

The wheel engaging arrangement 16 of this embodiment comprises a first and a second wheel support arm 24.1 and 24.2 which are curved as shown to follow the circumference of the wheel assembly, typically to follow the running surfaces, of the wheel assembly 12. This feature is depicted in FIG. 2. It is pointed out that the first and second wheel support arms 24.1 and 24.2 define the cradle 18 which can hold the wheel assembly 12, in use the wheel assembly 12 resting on wheel rests 25.1 and 25.2.

The adjustor formation 22 here includes a telescopic adjustable base arm 26 which can cause the first and second wheel support arms 24.1 and 24.2 to be adjusted by being moved either towards or away from one another, thereby adjusting the dimensions of the cradle 18. As shown, the telescopic base arm 26 includes two base arm members 28.1 and 28.2 which are telescopically movably connected to a base arm sleeve 30. As shown, the base arm members 28.1 and 28.2 each include a numbers of set cavities 32 which can be held in register with corresponding cavities 34 with the use of set bolts 36.

The wheel handling apparatus 10 is provided with an actuator 38 for causing the wheel engaging arrangement 16 to move from a rest position to a wheel engaging position. In this example embodiment the actuator 38 is provided in the form of an hydraulic jack which is movable between a retracted position, shown in FIG. 1, in which it will cause the wheel engaging arrangement 16 to be located in its rest position. The hydraulic jack 38 is also moveable to an extended position, here extending in a direction upwardly from a floor surface as shown in FIG. 2, in which it causes the wheel engaging arrangement 16 to be located in its wheel engaging position.

The hydraulic jack 38 is connected respectively to a first and a second chain connector 40.1 and 40.2 which in turn are connected to a linkage arrangement, generally indicated by the reference numeral 41. The linkage arrangement 41 firstly comprises a first and a second crank 42.1 and 42.2 which are respectively connected to first and second connectors 44.1 and 44.2 which, in turn, are respectively connected to first and second support columns 46.1 and 46.2. The first and second support columns 46.1 and 46.2 are respectively telescopically movably located on first and second base columns 48.1 and 48.2.

In use, when the wheel handling apparatus 10 is required to be employed in removing the wheel assembly 12 due for maintenance, movement of the hydraulic jack 38 will cause the first and second chain connectors 40.1 and 40.2 to become taught, as a result causing the first and second cranks 42.1 and 42.2 to undergo an amount of rotation. Such rotation of the first and second crank 42.1 and 42.2 will induce movement in the first and second connectors 44.1 and 44.2 as a result allowing the first and second support columns 46.1 and 46.2 to undergo slidable movement relative to the first and second base column 48.1 and 48.2 to move in an upward direction so that the wheel assembly 12 can rest within the cradle 18 defined by the wheel engaging arrangement 16.

The wheel assembly will at this stage be elevated above ground level with the use of, for example, a heavy vehicle jack. The wheel assembly 12 can now be removed from the vehicle whereafter the hydraulic jack 38 can be allowed to return to its retracted position so that maintenance can commence.

Figure 3:
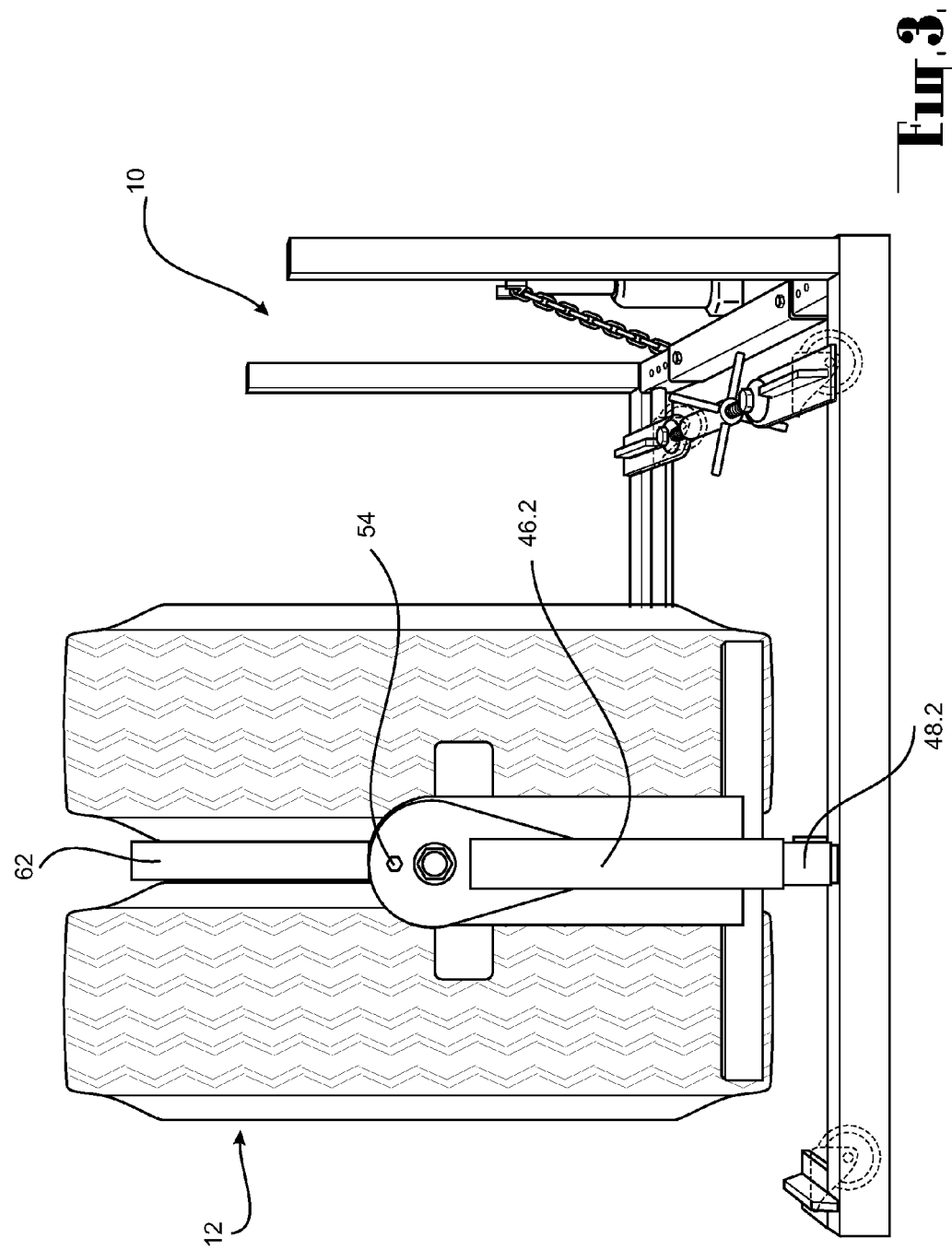
FIG. 3 is a side view of the wheel handling apparatus holding the wheel assembly.
Figure 4:
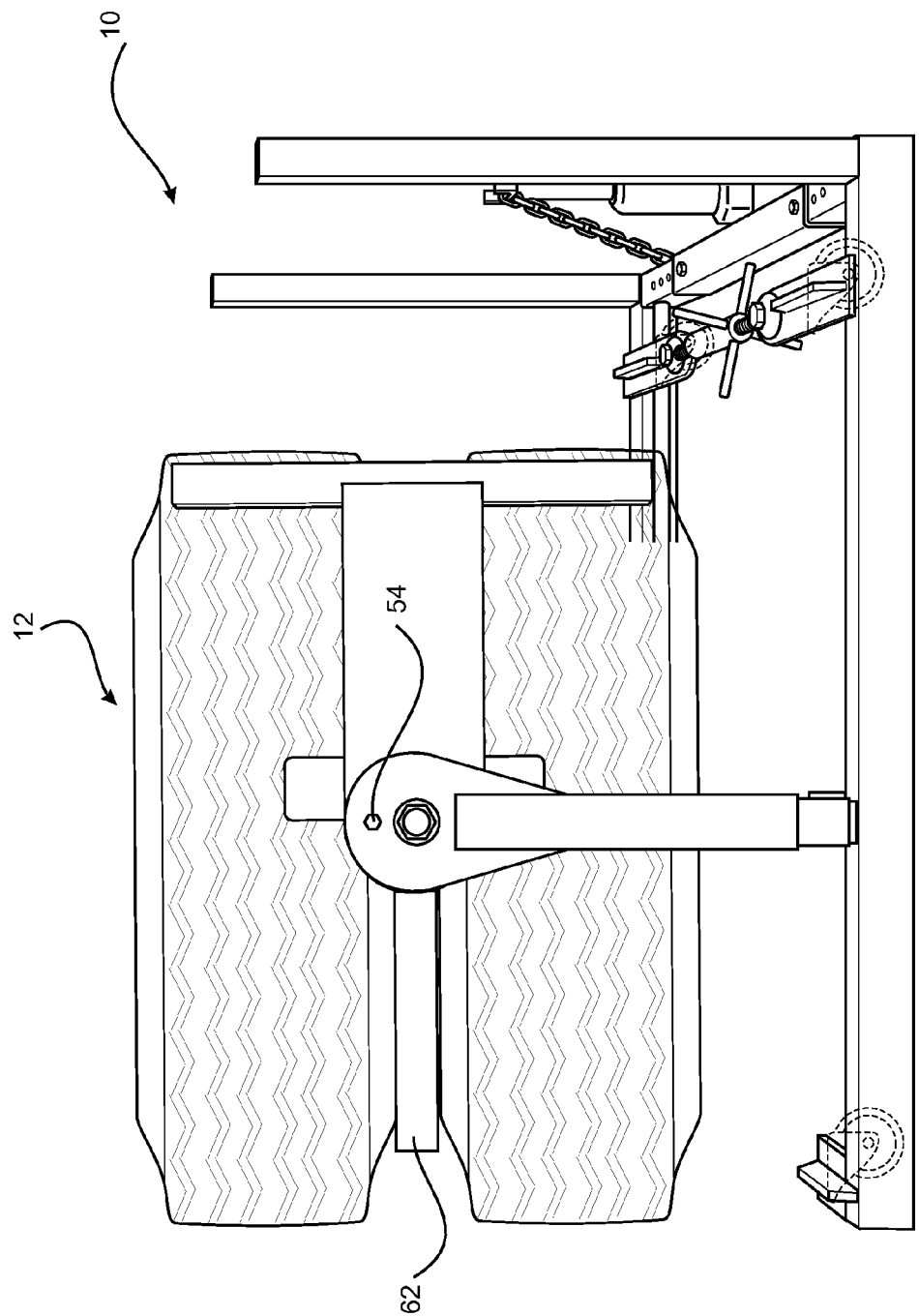
FIG. 4 is a further side view of the wheel handling apparatus holding the wheel assembly in a second orientation.

It is pointed out that the first and second wheel support arms 24.1 and 24.2 are respectively pivotally connected to first and second support columns 46.1 and 46.2 through a wheel pivoting arrangement 47. The wheel pivoting arrangement 47 is here provided in the form of pivot pins 49 and sliding surfaces 51.1 and 51.2 which connect the first and second support columns 46.1 and 46.2 with the first and second wheel support arms 24.1 and 24.2 respectively. This feature will in use allow the wheel support arms 24.1 and 24.2 to be moved between a first orientation to a second orientation, as a consequence also causing the wheel assembly to be moved between a first and second orientation as desired by a person undertaking maintenance work on the wheel assembly 12. Examples of different orientations of the wheel assembly 12 are illustrated in FIGS. 3 and 4 of the drawings.

As shown, the wheel engaging arrangement 16 includes a setting arrangement 50 whereby the wheel support arms 24.1 and 24.2 can be secured in their respective first and second orientations. In this embodiment the setting arrangement 50 comprises that the wheel support arms 24.1 and 24.2 each includes a number of holes 52 which are displaced in a circular formation as shown. The holes 50 can then be located in register with a corresponding hole on the support columns 46.1 and 46.2, depending on the orientation of the wheel support arms 24.1 and 24.2 and held in position with a suitable lock member 54, shown in FIGS. 3 to 5.

Referring again to FIG. 1, the support 20 includes two support members 56.1 and 56.2 which are spaced apart by the adjustable base arm 26 as shown.

A further aspect of this embodiment is that its adjustor formation 22 includes an adjustor sub-assembly 57, here in the form of a turn buckle, which is connected between the support members 56.1 and 56.2. In use the turn buckle 57 can cause the support members 56.1 and 56.2 to undergo a small amount of movement to allow easy location of the wheel assembly 12 on the wheel handling apparatus 10.

The wheel support arms 24.1 and 24.2 each includes a connection arrangement 58 which can be engaged by a complimentary protrusion 60 on a handle member 62 as shown in FIG. 1. In FIG. 2 the handle members 62 have been slid from their storage pillars 64 and their protrusions 60 have been slotted into the connection arrangements 58 of the respective wheel support arms 24.1 and 24.2. The handle members 62 can now be used to cause the wheel assembly 12 to be located in a desired orientation.

In order to allow the wheel handling apparatus 10 to be moved between locations it is provided with a number of wheels 66 as shown.

Figure 5:
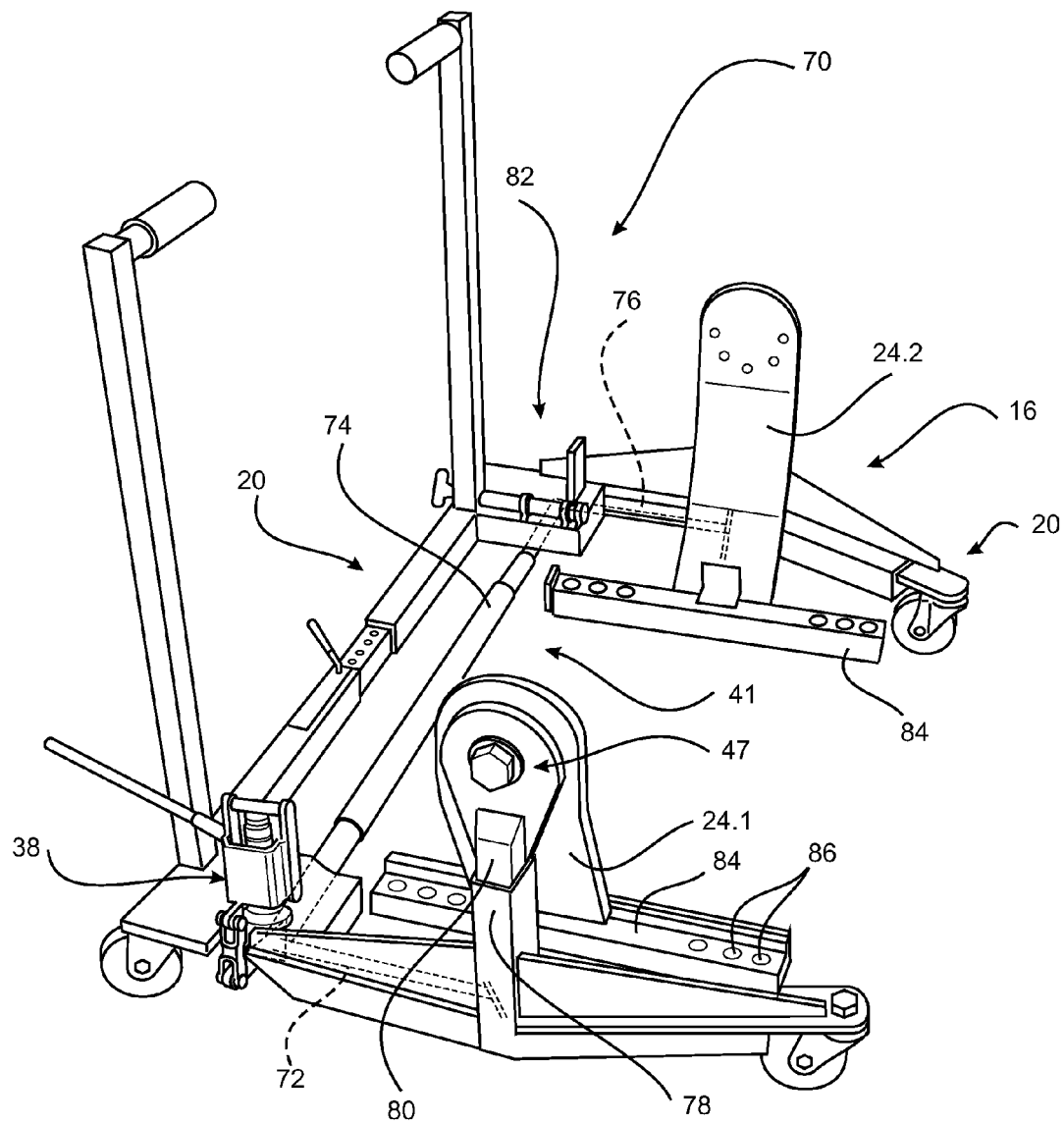
FIG. 5 is a perspective of a wheel handling apparatus in accordance with another example embodiment of the invention.
Figure 6:
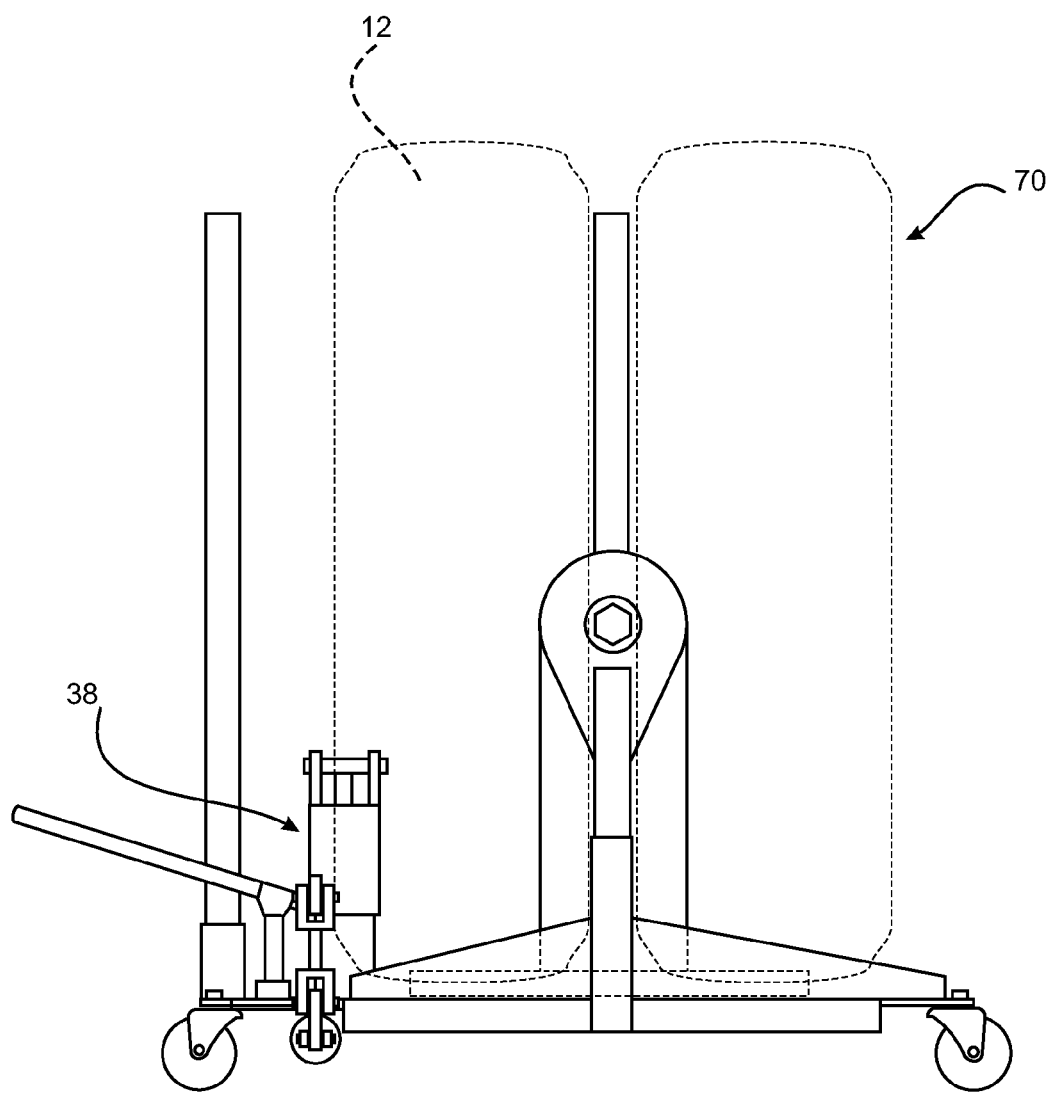
FIG. 6 is a side view of the wheel handling apparatus of FIG. 5.

FIGS. 5 and 6 depict another example embodiment of a wheel handling apparatus in accordance with the invention, generally indicated with the reference numeral 70. The description which follows will focus on the points of difference between the first and second embodiments of the wheel handling apparatus and like reference numerals will be used to indicate like components.

The wheel handling apparatus 70 includes an actuator 38 which is located towards a side of the wheel handling apparatus as shown in FIG. 5. It is believed that this configuration will provide a person with enhanced access to work on the wheel assembly 12, as compared to the position of the actuator 38 in the wheel handling apparatus 10. Further, the wheel handling apparatus 70 no longer includes chain connectors 40.1 and 40.2 which connect the actuator 38 with cranks 42.1 and 42.2. Rather, in the wheel handling apparatus 70 the actuator 38 is directly connected to a linkage arrangement 41 which in turn is connected to the first and second wheel support arms 24.1 and 24.2.

The linkage arrangement firstly comprises a first link 72 which connects the actuator 38, again in the form of an hydraulic jack, with the first wheel support arm 24.1. The actuator 38 is further connected to a telescopically adjustable arm 74 which in turn is connected to a second link 76 attached to the second wheel support arm 24.2. In use, movement of the actuator 38 from a retracted position to an extended position will induce moment in the first and second links 72 and 76 allowing the wheel engaging arrangement 16 to move from its rest position to its extended position in a manner similar to that described above for the wheel handling apparatus 10.

It is also pointed out that the support 20 of this embodiment provides sleeves 78 in which upright members 80 of the wheel support arms 24.1 and 24.2 can undergo slidable movement.

It is further pointed out that the wheel handling apparatus 70 includes an adjustable stop 82 which is movable between an obstruct position in which it will obstruct movement of the wheel assembly 12 held by the wheel engaging arrangement 16. The stop 82 can also be located in a rest position in which it will no longer obstruct movement of the wheel assembly 12 and will allow the wheel engaging arrangement 16 to be moved from a first to a second orientation.

Another feature of the wheel handling apparatus 70 is that its wheel support arms include wheel rests 84 as shown on which a wheel assembly 12 can rest and which are provided with a number of cavities in which additional wheel handle members can be placed.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The example embodiments being thus described, it will be obvious that the same may be varied in many ways. Such variations are not to be regarded as departure from the example embodiments, and all such modifications as would be obvious to one skilled in the art are intended to be included within the appended claims herein.

The claims defining the invention are as follows:

1. A wheel handling apparatus, comprising:
    a wheel engaging arrangement for holding a wheel assembly that is to be removed from a vehicle, the wheel engaging arrangement including a first and a second wheel support arm, each wheel support arm being curved to follow the circumference of the wheel assembly, thereby defining a cradle in which the wheel assembly can rest as it is removed from the vehicle,
    a wheel pivoting arrangement, whereby wherein the wheel engaging arrangement can be moved is movable between a first orientation and a second orientation thus causing the wheel assembly held by the wheel engaging arrangement also to be moved between a first and second orientation, and
    an actuator for causing the wheel engaging arrangement to move from a rest position to a wheel engaging position, the actuator including a hydraulic jack movable between a retracted position causing the wheel engaging arrangement to be located in its rest position, and an extended position causing the wheel engaging arrangement to be located in its wheel engaging position, the hydraulic jack connected to a first and a second chain connector which in turn are connected to a linkage arrangement, the linkage arrangement including a first and a second crank which are respectively connected to said first and second chain connectors which, in turn, are respectively connected to first and second support columns.

2. The apparatus of claim 1, further comprising a support for carrying the wheel engaging arrangement.

3. The apparatus of claim 2, further comprising an adjustor formation configured to cooperate with the wheel engaging arrangement in order to adjust the dimensions of the cradle defined by the wheel engaging arrangement.

4. The apparatus according to of claim 3, wherein the adjustor formation includes a telescopic adjustable base arm which can cause the first and second wheel support arms to be moved either towards or away from one another to adjust dimensions of the cradle.

5. The apparatus of claim 1, wherein the wheel pivoting arrangement includes a setting arrangement which facilitates the wheel support arms to be secured in their respective first and second orientations.

6. The apparatus of claim 4, wherein the support comprises two support members which are spaced apart by the adjustable base arm.

7. The apparatus of claim 1, wherein each wheel support arm includes a connection arrangement which can be engaged by a handle member.

* * * * *